(12) United States Patent
Ertimo et al.

(10) Patent No.: US 12,256,334 B2
(45) Date of Patent: Mar. 18, 2025

(54) UPLINK POWER CONTROL

(71) Applicant: Elisa Oyj, Helsinki (FI)

(72) Inventors: Riku Ertimo, Helsinki (FI); Henri Lahtinen, Helsinki (FI); Juho Poutanen, Helsinki (FI)

(73) Assignee: ELISA OYJ, Helsinki (FI)

( * ) Notice: Subject to any disclaimer, the term of this patent is extended or adjusted under 35 U.S.C. 154(b) by 0 days.

(21) Appl. No.: 18/711,121

(22) PCT Filed: Dec. 21, 2022

(86) PCT No.: PCT/FI2022/050857
§ 371 (c)(1),
(2) Date: May 17, 2024

(87) PCT Pub. No.: WO2023/118662
PCT Pub. Date: Jun. 29, 2023

(65) Prior Publication Data
US 2024/0422691 A1    Dec. 19, 2024

(30) Foreign Application Priority Data
Dec. 23, 2021  (FI) ...................................... 20216337

(51) Int. Cl.
*H04W 52/14* (2009.01)
*H04W 52/24* (2009.01)
*H04W 52/36* (2009.01)

(52) U.S. Cl.
CPC ....... *H04W 52/146* (2013.01); *H04W 52/241* (2013.01); *H04W 52/365* (2013.01)

(58) Field of Classification Search
CPC . H04W 52/146; H04W 52/365; H04W 52/36; H04W 52/241
See application file for complete search history.

(56) References Cited

U.S. PATENT DOCUMENTS

| | | | |
|---|---|---|---|
| 9,319,989 B2 | 4/2016 | Zhang et al. | |
| 2010/0323746 A1* | 12/2010 | Zhang | H04W 52/36 455/522 |
| 2016/0360462 A1* | 12/2016 | Chockalingam | H04W 36/0058 |

(Continued)

FOREIGN PATENT DOCUMENTS

| | | |
|---|---|---|
| EP | 2782405 A1 | 9/2014 |
| EP | 3051884 A1 | 8/2016 |
| KR | 101653927 | 9/2016 |

*Primary Examiner* — John J Lee
(74) *Attorney, Agent, or Firm* — Espatent Oy (57) ABSTRACT

A computer implemented method for uplink power control in a mobile network. The method is performed by obtaining (301) signal to interference and noise ratio, SINR, of a first cell of the mobile network; comparing (302) the SINR to current uplink power parameter of the first cell; determining (303) a new value for the uplink power parameter based on the comparison so that, if the SINR is higher than the current uplink power parameter, the current uplink power parameter is increased to obtain the new value for the uplink power parameter, and if the SINR is lower than the current uplink power parameter, the current uplink power parameter is decreased to obtain the new value for the uplink power parameter; and providing (304) the determined new value of the uplink power parameter for use in uplink power control of the first cell.

20 Claims, 4 Drawing Sheets

(56) References Cited

U.S. PATENT DOCUMENTS

2017/0055229 A1 2/2017 Klockar et al.
2017/0289923 A1* 10/2017 Madan ................ H04B 17/309
2019/0200363 A1 6/2019 Rajendran \* cited by examiner

| 320. Determine interference intensity between first and second cells |
|---|
| 321. Use number of handovers in determining the interference intensity |
| 323. Use resource utilization rate in determining the interference intensity |
| 324. Select second cell(s) with highest interference intensity |

UPLINK POWER CONTROL

TECHNICAL FIELD

The present disclosure generally relates to uplink power control in mobile network.

BACKGROUND

This section illustrates useful background information without admission of any technique described herein representative of the state of the art.

In a mobile networks, uplink performance is, among others, dictated by the power that UE (user equipment) is using during the transmission. This power is defined by several parameters in network elements. The power should be sufficiently high for good quality transmission, but at the same time not too high to cause too much interference in neighboring cells.

In a typical scenario same power control parameters are used across the mobile network at least within the same frequency layer.

Now a new approach is taken.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

According to a first example aspect there is provided a computer implemented method for uplink power control in a mobile network. In an example case, the method comprises obtaining signal to interference and noise ratio, SINR, of a first cell of the mobile network; comparing the SINR to current uplink power parameter of the first cell;
    determining a new value for the uplink power parameter based on the comparison so that
        if the SINR is higher than the current uplink power parameter, the current uplink power parameter is increased to obtain the new value for the uplink power parameter, and
        if the SINR is lower than the current uplink power parameter, the current uplink power parameter is decreased to obtain the new value for the uplink power parameter; and
    providing the determined new value of the uplink power parameter for use in uplink power control of the first cell.

In some embodiments, the method further comprises obtaining power headroom, PHR, of the first cell and/or PHR of a second cell of the mobile network. The current uplink power parameter may then be limited by the PHR of the first cell. Additionally or alternatively, if the PHR of the second cell is below 0, the new value for the uplink power parameter may be performed by decreasing the current uplink power parameter in the first cell.

In some embodiments, the method further comprises determining the PHR based on PHR of a plurality of user equipment in respective cell.

In some embodiments, the method further comprises evaluating performance of the first cell; and if deterioration of performance is detected, performing rollback to previous uplink power parameter or to a default uplink power parameter, and else keeping the determined new value of the uplink power parameter.

In some embodiments, the current uplink power parameter of the first cell is increased by min((SINR−current uplink power parameter), PHR of the second cell) or by min((SINR−current uplink power parameter), PHR of the first cell, PHR of the second cell).

In some embodiments, the current uplink power parameter of the first cell is decreased by (current uplink power parameter-SINR), if the SINR is lower than the current uplink power parameter.

In some embodiments, the current uplink power parameter of the first cell is decreased by abs(PHR of the second cell), if the PHR of the second cell is below 0.

In some embodiments, the method further comprises determining interference intensity between the first cell and a plurality of second cells; and selecting a second cell with highest interference intensity.

In some embodiments, the interference intensity is determined based on number of handovers between the first and second cells.

In some embodiments, the interference intensity is determined based on number of handovers between the first and second cells, and resource utilization rate in the first and second cells.

In some embodiments, more than one second cells are taken into account.

In some embodiments, the method further comprises performing the method only for N cells of same frequency and/or for M cells of same base station site.

In some embodiments, the method further comprises comparing the determined new value of the uplink power parameter to a predetermined minimum change; and providing (304a) the determined new value of the uplink power parameter for use in uplink power control of the first cell only if the predetermined minimum change is exceeded.

According to a second example aspect of the present invention, there is provided an apparatus comprising a processor and a memory including computer program code; the memory and the computer program code configured to, with the processor, cause the apparatus to perform the method of the first aspect or any related embodiment.

According to a third example aspect of the present invention, there is provided a computer program comprising computer executable program code which when executed by a processor causes an apparatus to perform the method of the first aspect or any related embodiment.

According to a fourth example aspect there is provided a computer program product comprising a non-transitory computer readable medium having the computer program of the third example aspect stored thereon.

According to a fifth example aspect there is provided an apparatus comprising means for performing the method of any preceding aspect.

Any foregoing memory medium may comprise a digital data storage such as a data disc or diskette; optical storage; magnetic storage; holographic storage; opto-magnetic storage; phase-change memory; resistive random-access memory; magnetic random-access memory; solid-electrolyte memory; ferroelectric random-access memory; organic memory; or polymer memory. The memory medium may be formed into a device without other substantial functions than storing memory or it may be formed as part of a device with other functions, including but not limited to a memory of a computer; a chip set; and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which.

DETAILED DESCRIPTION

In the following description, like reference signs denote like elements or steps.

Various embodiments of present disclosure provide cell specific uplink power control. Various embodiments provide that uplink transmission power may be increased at least in some cells compared to using same power control parameters in all cells. Increased transmission power provides increased SINR (signal to interference and noise ratio), which results in improved throughput.

Various embodiments further provide lowering the uplink transmission power to avoid excess interference. This further improves the overall performance.

Still further, a rollback mechanism is provided to discard undesired changes in uplink power.

The method of various embodiments can be run at predefined intervals, such as once a week. In this way, the power control method adapts to network changes.

Figure 1:
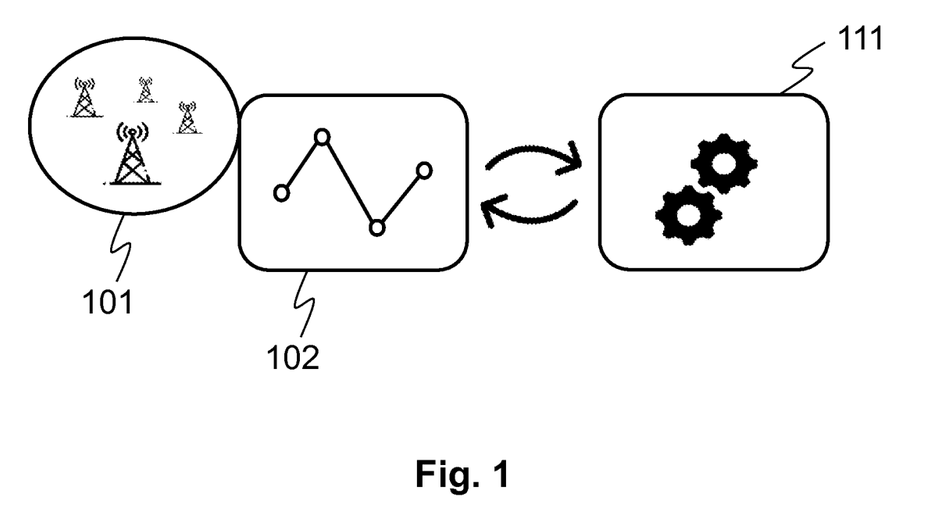
FIG. 1 schematically shows an example scenario according to an embodiment.

FIG. 1 schematically shows an example scenario according to an embodiment. The scenario shows a mobile network 101 comprising a plurality of cells and base stations and other network devices, and an operations support system, OSS, 102 configured to manage operations of the mobile network 101. Further, the scenario shows an automation system 111. The automation system 111 is operable to interact with the OSS 102 for example to receive data from the OSS 102 and to provide new settings to the mobile network 101 through the OSS 102.

The automation system 111 is configured to implement at least some example embodiments of present disclosure.

In an example embodiment the scenario of FIG. 1 operates as follows: The automation system 111 receives data from the mobile network 101 e.g. through the OSS 102. The data is automatically analysed in the automation system 111 to identify cells in which uplink power can be adjusted. Based on results of the analysis, the automation system 111 provides new power control parameters for use in some cells of the mobile network 101.

Additionally, the results of the analysis may be stored for later use and/or shown on a display or otherwise output to a user. The analysis performed in the automation system 111 may be automatically or manually triggered. The analysis may be periodically repeated (e.g. once a day, every 1-14 days, once a week, every two weeks, once a month).

Figure 2:
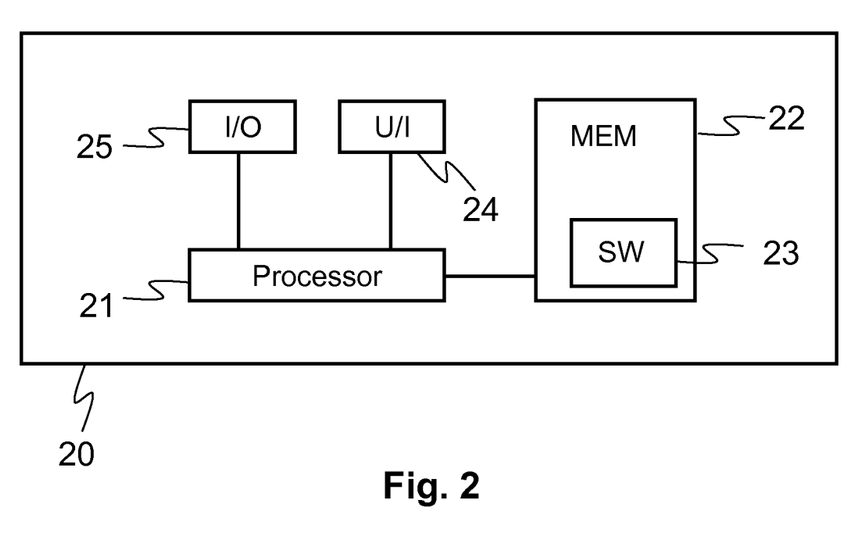
FIG. 2 shows a block diagram of an apparatus according to an example embodiment.

FIG. 2 shows a block diagram of an apparatus 20 according to an embodiment. The apparatus 20 is for example a general-purpose computer or server or some other electronic data processing apparatus or a cloud computing environment. The apparatus 20 can be used for implementing at least some embodiments of present disclosure. That is, with suitable configuration the apparatus 20 is suited for operating for example as the automation system 111 of FIG. 1.

The apparatus 20 comprises a communication interface 25; a processor 21; a user interface 24; and a memory 22. The apparatus 20 further comprises software 23 stored in the memory 22 and operable to be loaded into and executed in the processor 21. The software 23 may comprise one or more software modules and can be in the form of a computer program product.

The processor 21 may comprise a central processing unit (CPU), a microprocessor, a digital signal processor (DSP), a graphics processing unit, or the like. FIG. 2 shows one processor 21, but the apparatus 20 may comprise a plurality of processors.

The user interface 24 is configured for providing interaction with a user of the apparatus. Additionally or alternatively, the user interaction may be implemented through the communication interface 25. The user interface 24 may comprise a circuitry for receiving input from a user of the apparatus 20, e.g., via a keyboard, graphical user interface shown on the display of the apparatus 20, speech recognition circuitry, or an accessory device, such as a headset, and for providing output to the user via, e.g., a graphical user interface or a loudspeaker.

The memory 22 may comprise for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories. The memory 22 may serve the sole purpose of storing data, or be constructed as a part of an apparatus 20 serving other purposes, such as processing data.

The communication interface 25 may comprise communication modules that implement data transmission to and from the apparatus 20. The communication modules may comprise a wireless or a wired interface module(s) or both. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. The communication interface 25 may support one or more different communication technologies. The apparatus 20 may additionally or alternatively comprise more than one of the communication interfaces 25.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like.

Figure 3A:
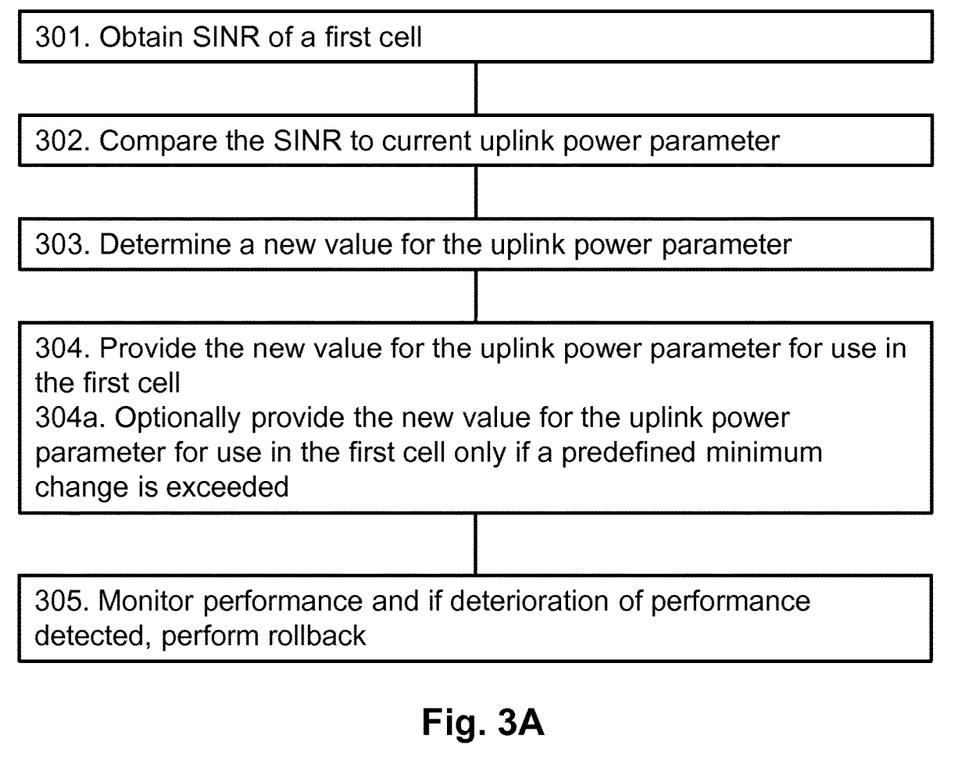
FIGS. 3A-3C show flow charts according to example embodiments.
Figure 3B:
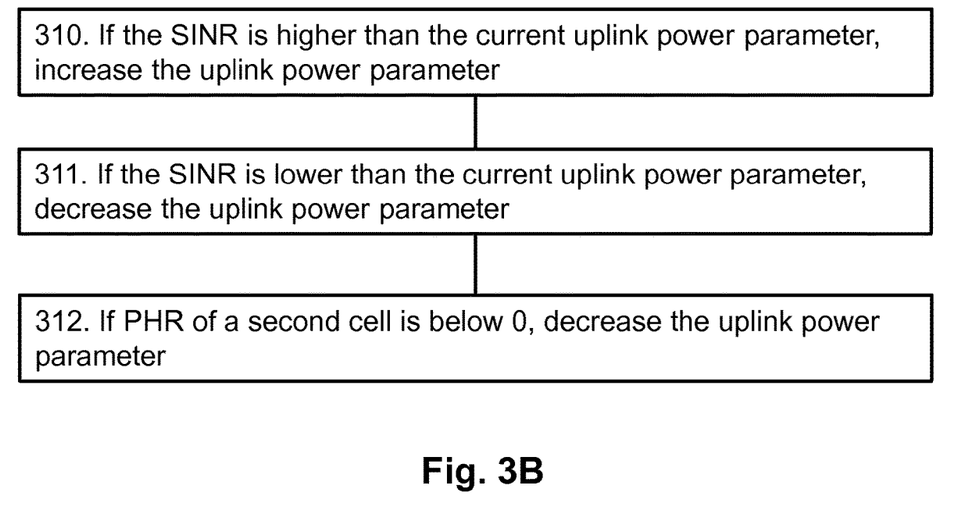
Figure 3C:
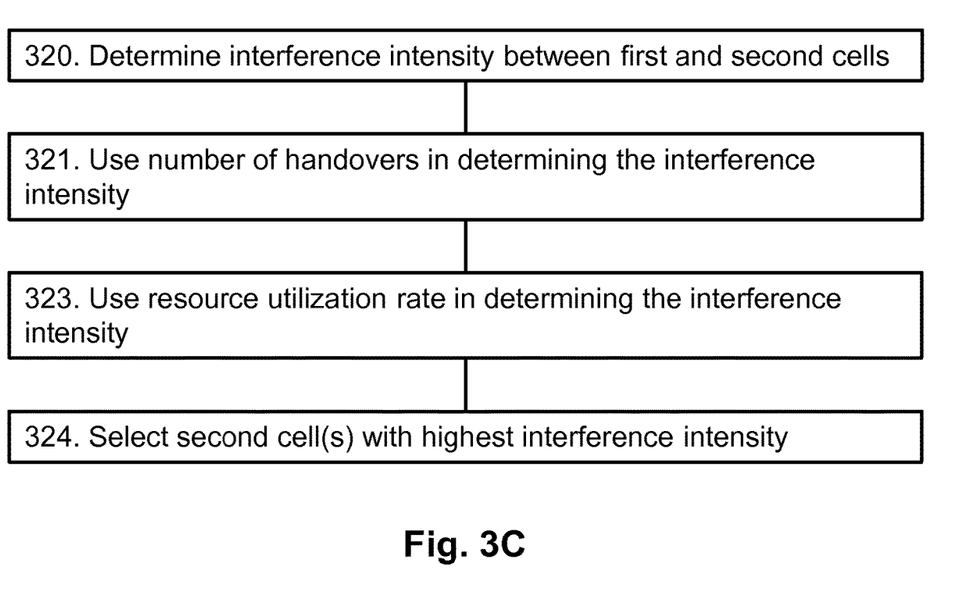

FIGS. 3A-3C show flow charts according to example embodiments. The flow charts illustrate processes comprising various possible steps including some optional steps while also further steps can be included and/or some of the steps can be performed more than once. The processes may be implemented in the automation system 111 of FIG. 1 and/or in the apparatus 20 of FIG. 2. The processes are implemented in a computer program code and do not require human interaction unless otherwise expressly stated. It is to be noted that the processes may however provide output that may be further processed by humans and/or the processes may require user input to start.

The process of FIG. 3A comprises the following steps:

301: Network performance data is obtained from a mobile network. The obtained data comprises at least SINR of a first cell of the mobile network.

SINR can be collected on UE level at a network device. Received uplink SINR may then be used by the network device for uplink closed loop power control of the UE.

302: The SINR is compared to current uplink power parameter.

The uplink power parameter is for example ulp-cLowqualSch parameter of mobile network standards. The uplink power parameter is a parameter that is used for controlling uplink power in user equipment. For example, 14 dB default value may be initially set for the uplink power parameter.

In general, the uplink power parameter can be defined as a parameter that sets reference to user equipment transmission power (via uplink closed loop power control) near cell edge. Power control mechanisms may increase the uplink power until this reference is reached or until the user equipment is using full power or until limited by inter- or intra-cell interference.

303: A new value is determined for the uplink power parameter. Examples of determining the new value are discussed in connection with FIG. 3B.

304: The determined new value is provided for use in the first cell. The determined new value is used in uplink power control in the first cell. In this way, different parameter may be taken into use in different cells. Thereby the uplink power parameter may adapt to varying operating conditions in different parts of the network.

304a: Optionally, there may be further conditions on whether the determined new value is taken into use or not. In an embodiment, the new value is provided for use in the first cell only if a predefined minimum change is exceeded. In this way oscillating small changes are avoided. The predefined minimum change may be for example +/−2 dB, but equally some other threshold may be used.

305: In an embodiment, network performance is monitored or evaluated and, if deterioration in performance is detected, rollback is performed. The uplink power parameter may be rolled back to previous value or to a default value. Otherwise, the new determined uplink power parameter is kept. This may help in avoiding any adverse parameter values.

The process of FIG. 3B provides examples of determining the new value for the uplink power control parameter.

For the purposes of at least some steps of FIG. 3B, a second cell is selected. The second cell is in general such cell that is likely to experience interference from the first cell. Examples of selecting the second cell are discussed in connection with FIG. 3C.

Further, power headroom, PHR, values are obtained for some steps of FIG. 3B. In general, PHR provides the amount of power the user equipment has left. Power Headroom Report tells if UE can transmit at a higher transmission power or not. In many cases PHR may be negative, i.e. there is not power left to increase.

A simple formula for PHR in LTE is:

PHR=UE Max Transmission Power−PUSCH Power, wherein

PUSCH Power=Physical Uplink Shared Channel Power.

PHR can be collected on UE level. Due to different locations of users and effects of path loss for example, PHR of different UEs in the same cell may vary. Network systems, e.g. OSS, may provide individual PHR values and/or counter data that is an aggregate of PHR values of multiple UEs. For example, PHR values of all UEs of a cell over a time period of one hour may be aggregated into one counter value. The aggregation may be performed e.g. by taking average. Such counter value may then be used as PHR of the cell in some embodiments. Clearly also other time periods are usable, such as one day or one week.

In various embodiments of present disclosure, PHR of some individual UE may be used as PHR of a cell. For example, the lowest PHR value of individual UEs of a cell may be used as PHR of the cell.

In some other embodiments, PHR of a cell may be determined based on PHR of a plurality of UEs in respective cell. For example, an aggregated counter value provided by network systems may be used.

In some embodiments, PHR of a first cell may be determined based on PHR of a plurality of UEs in the first cell and PHR of a second cell may be determined based on PHR of a plurality of UEs in the second cell.

310: If the SINR is higher than the current uplink power parameter, the current uplink power parameter is increased.

In an embodiment, the increase is calculated using equation: min((SINR−current uplink power threshold), PHR of the second cell). That is, the increase is defined as minimum of 1) the difference between the SINR and the current uplink power parameter and 2) the PHR of the second cell. In this way, the uplink power in the first cell is not increased, if the second cell does not have capacity to increase uplink power. In this way excess interference may be avoided.

In another embodiment, the increase is calculated using equation: min((SINR−current uplink power threshold), PHR of the first cell, PHR of the second cell). That is, the increase is defined as minimum of 1) the difference between the SINR and the current uplink power parameter, 2) the PHR of the first cell, and 3) the PHR of the second cell. In this way, the uplink power in the first cell is further limited by the PHR of the first cell, too. E.g. if some UEs in the first cell do not have room for increasing the uplink power, it may be wise not to excessively increase the uplink power in any UEs.

311: If the SINR is lower than the current uplink power parameter, the current uplink power parameter is decreased.

In an embodiment, the decrease is calculated using equation: (current uplink power threshold−SINR). That is, the decrease is defined as the difference between the SINR and the current uplink power parameter.

312: If the PHR of the second cell is below 0, the current uplink power parameter is decreased.

In an alternative embodiment, some other threshold value is used instead of 0. That is, if the PHR of the second cell is below a threshold, the current uplink power parameter is decreased. The threshold may be for example 0-2. If for example threshold value 2 is used, interference caused in surrounding network may be reduced, but at the same time possibilities to improve performance in the first cell are lower. With threshold value 0 one achieves that UEs use all available power on average.

In an embodiment, the decrease is calculated using equation: abs(PHR of the second cell).

That is, the decrease is defined by how much below zero the PHR is in the second cell. In this way, the power level in the first cell is decreased if the usable power levels in the second cell are low.

The process of FIG. 3C provides examples of selecting second cells.

320: Interference intensity is determined between the first cell and a plurality of second cells.

321: For example, number of handovers between the first and second cells may be used in determining the interference intensity. Only handovers from the first cell to the second cell or vice versa may be considered, or handovers in both directions may be considered. Further, successful handovers or handover attempts or both may be considered.

322: In addition to the number of handovers, resource utilization rate (e.g. how many power resource blocks, PRB, are used) may be used in determining the interference intensity.

In an embodiment, the interference intensity is obtained by multiplying the number of handovers by the resource utilization rate.

324: Second cell(s) with highest interference intensity are selected. Only the second cell with the highest interference intensity may be selected or a plurality of second cells may be taken into consideration.

If multiple second cells are considered, the lowest new value of the uplink power parameter may be provided for use. In this way, making large sudden changes may be avoided.

For example, predefined number of cells in geographical proximity of the first cell may be considered in the steps of FIG. 3C. The predefined number can be freely chosen based on the implementation details.

In an embodiment, some further conditions are checked before deciding on adjusting the uplink power parameter. These aim at ensuring that the adjustments are targeted to cells in which there is reasonable room for the adjustments. In this way, targeting of the adjustments may improve as the adjustments are more likely to have a positive effect on overall performance of the network.

In an embodiment, checking the further conditions comprise checking if there is room for the adjustments as follows. A first set of conditions and a second set of conditions may be determined. The first set comprises a) difference between SINR and current uplink power parameter in the first cell, b) PHR of the first cell, and c) difference between the SINR of the second cell and the SINR of the source cell. Further it is checked that PHR of the second cell is below a threshold. Minimum of the a), b) and c) may be considered to indicate if there is room for the adjustments. If the room for adjustments is very small, adjustments are not necessarily made at all. E.g. 1 dB adjustment may be considered too small. The second set comprises checking d) load in the first cell, and e) mobility in the first cell. In the second set, it may be checked that load and mobility in the first cell are sufficiently low, before uplink power parameter in increased. For example, PRB utilization <3% may be considered to indicate low load. For example, number of handovers <500 may be considered to indicate low mobility. Clearly these are only illustrative examples and other values and definitions can be used.

In an embodiment, checking the further conditions comprise that the various methods of present disclosure are performed only for predefined number of cells of same frequency. Additionally of alternatively, the various methods of present disclosure may be performed only for predefined number of cells of same base station site. The predefined numbers can be freely chosen based on the implementation details. In this way, making simultaneous changes all over the network is avoided. As changes in one part of the network may affect other parts of the network, it is beneficial to avoid making changes everywhere at the same time.

Figure 4:
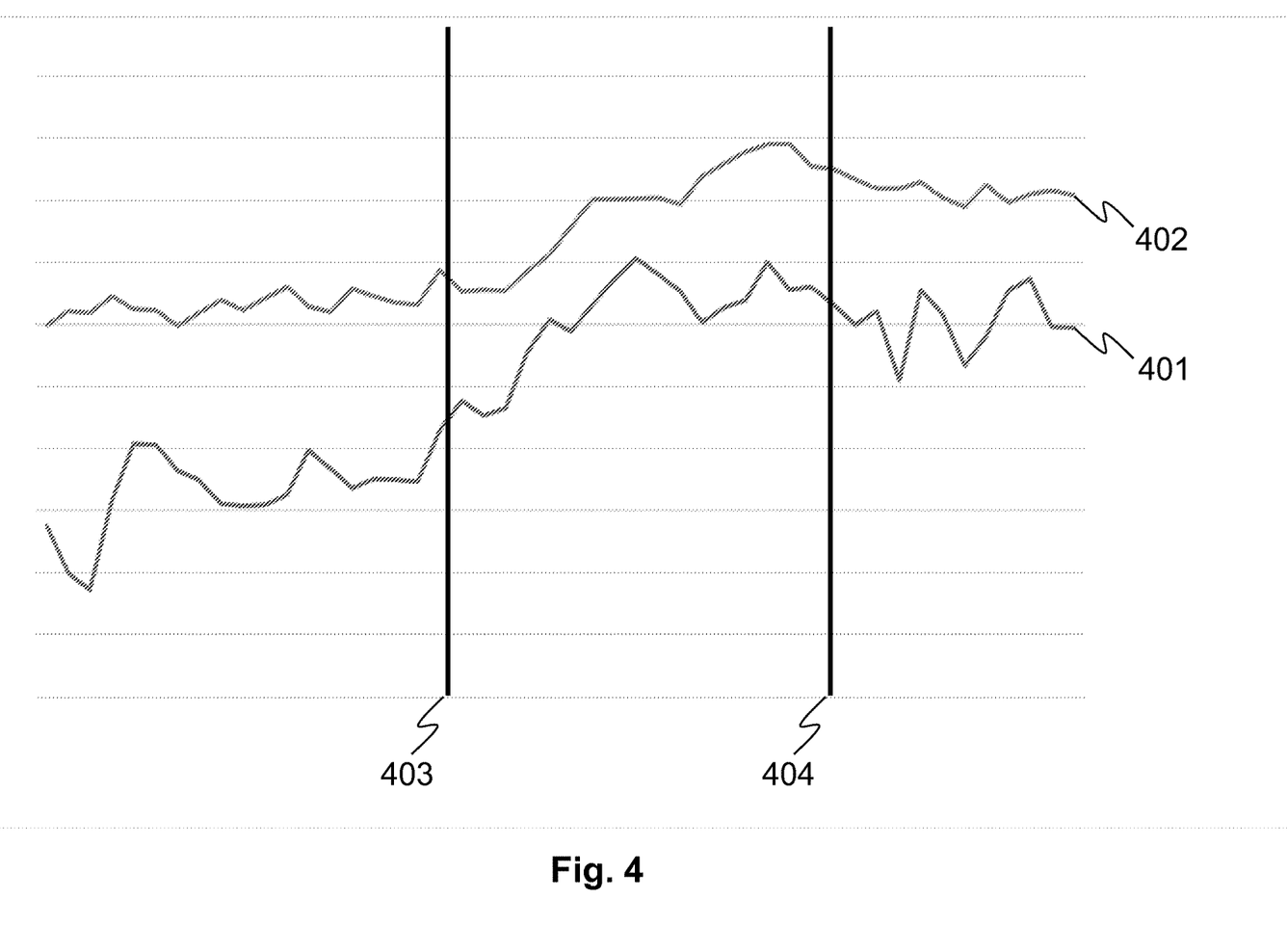
FIG. 4 shows a chart of an example case.

FIG. 4 shows a chart of an example case. The chart shows SINR as a function of time 401, 402 in two different cells. Line 403 indicates a point of time when uplink power adjustment according to embodiments of present disclosure was started, and line 403 indicates a point of time when uplink power adjustment was stopped. It can be seen from the chart that the use of the uplink power adjustment improved the SINR.

Without in any way limiting the scope, interpretation, or application of the appended claims, a technical effect of one or more of the example embodiments disclosed herein is method of controlling uplink power individually in each cell. In this way, network performance (e.g. throughput) may be improved.

Further, by dynamically adjusting the uplink power parameter, one may achieve that the area where user equipment may transmit with full power may be increased (or decreased) from default based on operating conditions of the cell. In this way capabilities of user equipment may be used in larger extend.

Any of the afore described methods, method steps, or combinations thereof, may be controlled or performed using hardware; software; firmware; or any combination thereof. The software and/or hardware may be local; distributed; centralised; virtualised; or any combination thereof. Moreover, any form of computing, including computational intelligence, may be used for controlling or performing any of the afore described methods, method steps, or combinations thereof. Computational intelligence may refer to, for example, any of artificial intelligence; neural networks; fuzzy logics; machine learning; genetic algorithms; evolutionary computation; or any combination thereof.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A computer implemented method for uplink power control in a mobile network, the method comprising:
obtaining signal to interference and noise ratio, SINR, of a first cell of the mobile network;

comparing the SINR to current uplink power parameter of the first cell, wherein the uplink power parameter is a parameter that is used for controlling uplink power in user equipment;

determining a new value for the uplink power parameter based on the comparison so that
- if the SINR is higher than the current uplink power parameter, the current uplink power parameter is increased to obtain the new value for the uplink power parameter, and
- if the SINR is lower than the current uplink power parameter, the current uplink power parameter is decreased to obtain the new value for the uplink power parameter; and providing the determined new value of the uplink power parameter for use in uplink power control of the first cell.

2. The method of claim 1, further comprising obtaining power headroom, PHR, of a second cell of the mobile network; and
- if the PHR of the second cell is below 0, determining the new value for the uplink power parameter by decreasing the current uplink power parameter in the first cell.

3. The method of claim 2, further comprising determining the PHR based on PHR of a plurality of user equipment in respective cell.

4. The method of claim 3, further comprising evaluating performance of the first cell; and
- if deterioration of performance is detected, performing rollback to previous uplink power parameter or to a default uplink power parameter, and else keeping the determined new value of the uplink power parameter.

5. The method of claim 2, wherein the current uplink power parameter of the first cell is increased by min ((SINR-current uplink power parameter), PHR of the second cell) or by min ((SINR-current uplink power parameter), PHR of the first cell, PHR of the second cell).

6. The method of claim 2, wherein the current uplink power parameter of the first cell is decreased by (current uplink power parameter-SINR), if the SINR is lower than the current uplink power parameter.

7. The method of claim 2, wherein the current uplink power parameter of the first cell is decreased by abs (PHR of the second cell), if the PHR of the second cell is below 0.

8. The method of claim 2, further comprising determining interference intensity between the first cell and a plurality of second cells; and selecting a second cell with highest interference intensity.

9. The method of claim 8, wherein the interference intensity is determined based on number of handovers between the first and second cells, and/or resource utilization rate in the first and second cells.

10. The method of claim 2, wherein more than one second cells are taken into account.

11. The method of claim 2, further comprising obtaining power headroom, PHR, of the first cell; and
limiting increase of the current uplink power parameter by the PHR of the first cell.

12. The method of claim 2, further comprising evaluating performance of the first cell; and
- if deterioration of performance is detected, performing rollback to previous uplink power parameter or to a default uplink power parameter, and else keeping the determined new value of the uplink power parameter.

13. The method of claim 1, further comprising obtaining power headroom, PHR, of the first cell; and
limiting increase of the current uplink power parameter by the PHR of the first cell.

14. The method of claim 13, further comprising determining the PHR based on PHR of a plurality of user equipment in respective cell.

15. The method of claim 13, further comprising evaluating performance of the first cell; and
- if deterioration of performance is detected, performing rollback to previous uplink power parameter or to a default uplink power parameter, and else keeping the determined new value of the uplink power parameter.

16. The method of claim 1, further comprising evaluating performance of the first cell; and
- if deterioration of performance is detected, performing rollback to previous uplink power parameter or to a default uplink power parameter, and else keeping the determined new value of the uplink power parameter.

17. The method of claim 1, further comprising performing the method only for N cells of same frequency and/or for M cells of same base station site.

18. The method of claim 1, further comprising comparing the determined new value of the uplink power parameter to a predetermined minimum change; and providing the determined new value of the uplink power parameter for use in uplink power control of the first cell only if the predetermined minimum change is exceeded.

19. An apparatus comprising
- a memory section comprising computer executable program code; and
- a processing section configured to cause the apparatus to perform, when executing the program code, the method of claim 1.

20. A non-transitory computer readable medium having stored thereon computer executable program code which when executed in an apparatus causes the apparatus to perform the method of claim 1.

* * * * *